(12) United States Patent
Sladecek (10) Patent No.: US 10,966,568 B2
(45) Date of Patent: Apr. 6, 2021

(54) AIR-BASED FRYER APPARATUS FOR PREPARING FOOD

(71) Applicant: KONINKLIJKE PHILIPS N.V., Eindhoven (NL)

(72) Inventor: Marcel Sladecek, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 246 days.

(21) Appl. No.: 15/511,278

(22) PCT Filed: Sep. 14, 2015

(86) PCT No.: PCT/EP2015/070988
§ 371 (c)(1),
(2) Date: Mar. 15, 2017

(87) PCT Pub. No.: WO2016/041912
PCT Pub. Date: Mar. 24, 2016

(65) Prior Publication Data
US 2017/0251874 A1 Sep. 7, 2017

(30) Foreign Application Priority Data
Sep. 17, 2014 (EP) .................................... 14185143

(51) Int. Cl.
*A47J 37/06* (2006.01)
*A47J 37/04* (2006.01)
*F24C 15/16* (2006.01)

(52) U.S. Cl.
CPC ......... *A47J 37/0641* (2013.01); *A47J 37/047* (2013.01); *A47J 37/0664* (2013.01); *F24C 15/16* (2013.01); *A47J 37/04* (2013.01)

(58) Field of Classification Search
CPC .. A47J 37/047; A47J 37/0641; A47J 37/0664; A47J 37/04; F24C 15/16

(Continued)

(56) References Cited

U.S. PATENT DOCUMENTS 4,622,231 A 11/1986 Swartley
5,027,697 A * 7/1991 De Longhi ........... A47J 37/047
99/348

(Continued)

FOREIGN PATENT DOCUMENTS

CN 201767796 U 3/2011
CN 203314797 U 12/2013

(Continued)

*Primary Examiner* — Steven B McAllister
*Assistant Examiner* — Benjamin W Johnson (57) ABSTRACT

The present invention relates to an air-based fryer apparatus (10) for preparing food. The apparatus (10) comprises a base part (12) comprising an upper support (14) and a gearing system (16) to generate a rotation force around a vertical rotation axis (18). The apparatus (10) further comprises a container (20) arranged on the upper support (14) and a food basket (22) with an air-permeable bottom part (24). The food basket is placed inside the container (20) such that a lateral gap (26) is arranged between walls of the container and walls of the food basket (22), and such that a bottom gap (32) is arranged between the bottom part of the container and said air-permeable bottom part (24). The apparatus (10) further comprises an upper lid device (34) arranged on top of the container (20). The upper lid device comprises a system (36) with primary heating means (38) and air ventilation means (40) for generating a flow of hot air in the lateral gap (26), in the bottom gap (32), and in the food basket (22). The gearing system (16) is adapted to provide a relative rotational movement at least between food arranged in the food basket and the flow of hot air in the food basket (22). This invention allows enhancing possibilities for the food preparation.

20 Claims, 4 Drawing Sheets (58) Field of Classification Search
USPC .................................................. 126/15 A
See application file for complete search history.

(56) References Cited

U.S. PATENT DOCUMENTS

| | | | |
|---|---|---|---|
| 5,699,722 A * | 12/1997 | Erickson | A47J 37/0623 |
| | | | 126/21 A |
| 6,936,795 B1 | 8/2005 | Moon | |
| 8,299,404 B2 | 10/2012 | Van Der Weij | |
| 2005/0223906 A1 | 10/2005 | Xu | |
| 2011/0256285 A1* | 10/2011 | De' Longhi | A47J 37/1209 |
| | | | 426/438 |
| 2012/0145140 A1 | 6/2012 | Chang | |

FOREIGN PATENT DOCUMENTS

| | | | |
|---|---|---|---|
| CN | 203776718 | * | 8/2014 |
| DE | 2412835 A1 | | 9/1975 |
| EP | 2255706 A1 | | 12/2010 |
| EP | 2292128 A1 | | 3/2011 |
| GB | 2007515 A | | 5/1979 |
| WO | 2010034374 A1 | | 4/2010 |

* cited by examiner

AIR-BASED FRYER APPARATUS FOR PREPARING FOOD

This application is the U.S. National Phase application under 35 U.S.C. § 371 of International Application No. PCT/EP2015/070988, filed on Sep. 14, 2015, which claims the benefit of International Application No. 14185143.6 filed on Sep. 17, 2014. These applications are hereby incorporated by reference herein.

FIELD OF THE INVENTION

The present invention relates to an apparatus for preparing food, in particular via using hot air.

BACKGROUND OF THE INVENTION

As an example for preparation of food, air-based fryers are known for preparing food such as fries or chicken, where the heat for preparing the food is provided by a stream of hot air. For the preparation and cooking procedure, the stream of hot air is generated to pass the food placed in a food preparation chamber. As an example, such appliances are used in the household environment.

For example, GB 2 007 515 A describes an air-circulating apparatus for cooking pots.

Air-based fryers have become increasingly popular, since they allow a very healthy food preparation compared to deep fat fryers, such as the deep fat fryer apparatus disclosed in patent WO2010/034374, due to the elimination of the necessity for frying the food in fat.

However, the possibilities for preparing food with known air-based fryers are sometimes limited, and not necessarily adapted to a large variety of food ingredients.

OBJECT AND SUMMARY OF THE INVENTION

There may thus be a need to provide an apparatus for preparing food that shows enhanced possibilities for preparing food.

The object of the present invention is solved by the subject-matter of the independent claims, wherein further embodiments are incorporated in the dependent claims.

According to the present invention, an air-based fryer apparatus for preparing food is provided. The apparatus comprising a base part with an upper support and a gearing system to generate a rotation force around a vertical rotation axis. The apparatus further comprises a container arranged on the upper support. The apparatus also comprises a food basket with an air-permeable bottom part. The food basket is placed inside the container such that a lateral gap is arranged between walls of the container and walls of the food basket. The food basket is also placed inside the container such that a bottom gap is arranged between the bottom part of the container and the air-permeable bottom part. The apparatus further comprises an upper lid device arranged on top of the container. The upper lid device comprises a system with primary heating means and air ventilation means for generating a flow of hot air in the lateral gap, in the bottom gap, and in the food basket. The gearing system provides a relative rotational movement at least between food arranged in the food basket and the flow of hot air in the food basket.

As an advantage, the user is provided with the possibility to arrange for a movement between the food in the food basket and the flow of hot air as well as relative to the radiation heat from the primary heating means. This allows an alternative way of preparing food in the apparatus, which allows for more diverse types of food preparation adapted to more types of ingredients.

According to an example, for relative rotational movement, the food basket is driven in rotation by the gearing system around the vertical rotation axis.

As an advantage, the food can be placed inside the basket and the rotation of the food in relation with the airstream is then provided by rotating the whole basket.

According to an example, the food basket is driven in rotation by direct coupling with the gearing system.

According to an example, for relative rotational movement, the food in the basket is stirred driven in rotation by the gearing system around the vertical rotation axis and the basket is fixed relative to the container.

According to an example, the base part comprises a food stirrer and the food basket is supported by the food stirrer.

As an advantage, the transmission of the rotational force from the gearing system to the food stirrer can be provided in a direct and compact and reliable manner. By arranging the food basket on top of the food stirrer, which supports the food basket and also then rotates the food basket, the rotational force is transmitted to the food basket in a simplified manner.

According to an example, the base part comprises a secondary heating element to heat the upper support.

As a further advantage, an additional way of providing the thermal energy for preparing the food is provided. As a still further advantage, the provision of the secondary heating elements allows the apparatus to be used for a further purpose, for example for preparing food in the container.

According to an example, the apparatus further comprises an air guide member provided in the container below the food basket to guide air upwards in the food basket.

The air guide member allows a further improved distribution of the flow of hot air.

According to an example, the air guide member is movable and is driven in rotation by the gearing system.

As a result, a relative movement between the food arranged in the food basket and the flow of hot air in the food basket is provided. The rotation of the air guide member can be provided also in addition to a rotating food basket.

According to an example, a food stirring element is provided in the food basket that is driven in rotation by the gearing system.

Hence, the food arranged in the food basket can be moved in a relative rotational movement to the flow of hot air, since the stirring element so-to-speak rotates the food in the food basket. The food stirring element can be provided in addition to a rotatable air guide member, and/or in addition with a rotating food basket.

According to an example, the primary and secondary heating means are provided as dual-heat supply means. In a primary heating mode, convection heat from the primary heating elements is supplied to the flow of air provided by the ventilation means. In a secondary heating mode, heat from the secondary heating elements is supplied to the food in the food basket, and/or to food in the container.

This allows for a multi-purpose preparation of food and further enhances the possible food preparation concepts and thus allows an enlarged variety of recipes for preparing food.

In an example, the heat from the secondary heating elements is radiation heat.

In an example, the radiation heat is providing a grill mode of the apparatus.

In a further example, a third heating mode is provided, in which convection and radiation heat is provided to the food in the food basket.

According to an example, a dual-function rotation arrangement is provided comprising first rotation means for stirring food inside the food basket in relation to the food basket, and second rotation means for providing a relative movement between the food basket and the flow of hot air.

As a result, two different types of rotational movement can be provided in relation with the food preparation procedure.

According to an example, the apparatus is a multi-mode food preparation apparatus comprising at least a first mode of operation and a second mode of operation. The first mode is a hot air mode, in which food is arranged inside the food basket, and in which heat is provided mainly by the primary heating means. The second mode is a cooking mode, in which food is arranged inside the food basket, and/or in which food is arranged inside the container, and in which heat is provided mainly by the secondary heating means from below.

In an example, in the second mode, food is arranged inside the container, and the food basket is temporarily removed.

According to an example, a third mode is a dual-heat mode, in which food is arranged inside the food basket, and in which heat is provided from the primary heating means and the secondary heating means.

According to an example, an adapter arrangement is provided for temporarily connecting the upper lid device to the container.

As an advantage, it is possible to temporarily remove the upper lid device and to use the base part with the container arranged on the upper support for other food preparation purposes, such as for food cooking purposes, for example if secondary heating means are provided in the base part.

According to an aspect, an air-based fryer is provided with rotation means in order to provide a relative rotational movement at least between the food that is arranged in the food basket and the flow of hot air streaming through the food basket. The rotational movement can be provided, for example, by rotating the food basket. Another example provides the rotational movement in form of stirring the food in the food basket. In an example, as a further option, further heating means are provided in the base part in order to allow further way of providing the thermal energy to the food. As a general concept, a food volume is provided as a centre part, and a base part and an upper lid part are provided that each comprises functional components, such as a heater, motor, electronics, or a user interface for controlling the respective functions. In an example, the upper and lower functional components can be controlled by a single user interface, or by respectively provided interfaces. The functional components can be controlled independently, or be controlled according to preset food preparation programs.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1:
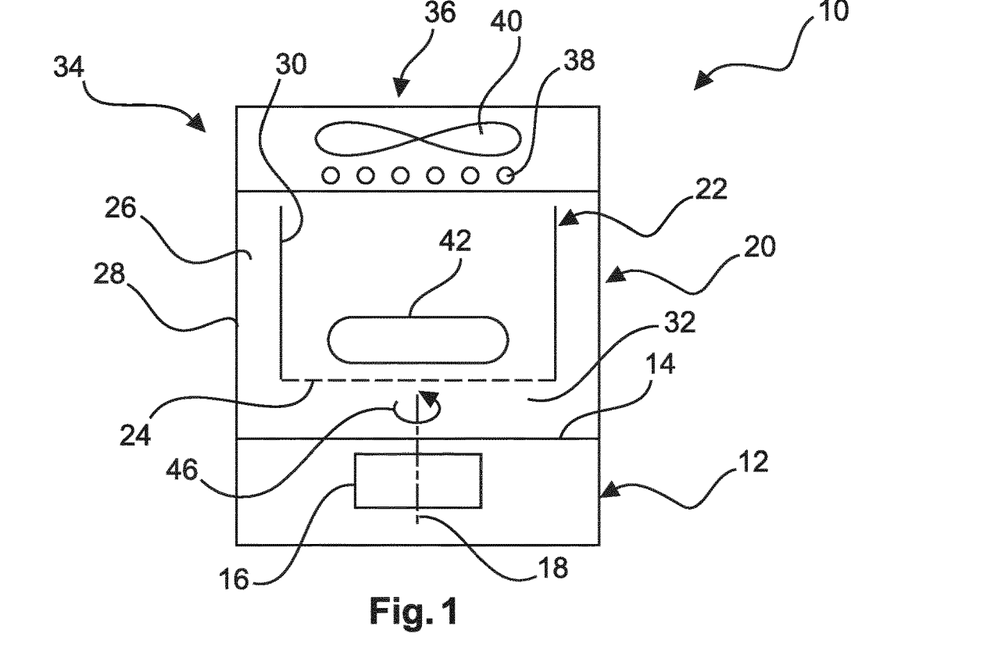
FIG. 1 shows a schematic vertical cross-section through an example of an apparatus for preparing food according to the invention.

FIG. 1 shows a schematic cross-section of an air-based fryer apparatus 10 for preparing food according to the invention. The apparatus comprises a base part 12 with an upper support 14 and a gearing system 16 to generate a rotation force around a vertical rotation axis 18. Further, a container 20 is provided that is arranged on the upper support 14. A food basket 22 is placed inside the container 20. The food basket 22 has an air-permeable bottom part 24. The food basket 22 is placed inside the container 20 such that a lateral gap 26 is arranged between walls 28 of the container 20 and walls 30 of the food basket 22. In FIG. 1, the walls 28 of the container 20 are schematically shown only. Similar is the case for the walls 30 of the food basket 22, which are also only schematically shown. The food basket 22 is placed inside the container 20 further such that a bottom gap 32 is arranged between a bottom part of the container and the air-permeable bottom part 24 of the food basket 22.

Further, an upper lid device 34 is arranged on top of the container 20. The upper lid device 34 comprises a system 36 with primary heating means 38 and air ventilation means 40 for generating a flow of hot air in the lateral gap 26, in the bottom gap 32, and in the food basket 22. For simplicity, the flow of hot air is not further shown in FIG. 1, but is indicated in the further examples of the following figures.

In an example, the lateral gaps 26 are arranged as sidewards air ventilation ducts between the food basket 22 and an inner wall of the container 20. Further, a bottom air ventilation duct is provided below the air-permeable bottom part 24.

In an example, the flow of hot air is supplied to the food basket 22 such that food in the food basket 22 is prepared by a through-streaming of hot air.

In an example, the flow of hot air is a downward flow in the lateral gap.

In an example, the circulating stream passes the sidewards air ventilation duct and enters the food basket from below before the air flow reaches the ventilation and heating means of the system 36.

In an example, the flow of hot air is provided as a circulating stream of hot air, for example provided by the ventilation ducts.

The gearing system 16 provides a relative rotational movement at least between food 42 in the food basket 22 and the flow of hot air in the food basket.

The primary heating means are also referred to as first heating means.

In an example, the apparatus is a home cooking appliance. In another example, the apparatus is a portable household apparatus.

In an example, the upper lid device 34 is also referred to as upper lid arrangement.

In an example, the upper lid device 34 is also referred to as "air-flying" lid. The upper lid device 34 may be provided as an add-on application for an existing food cooking apparatus in order to transform, for example, a home cooker into a cook-or-fry apparatus.

In an example, the food basket 22 is also referred to as food preparation chamber.

In an example, the food basket 22 is having a bottom part with a plurality of openings.

In FIG. 1, the system 36 is shown having the primary heating means 38 and the ventilation means 40 formed integrally.

Figure 2:
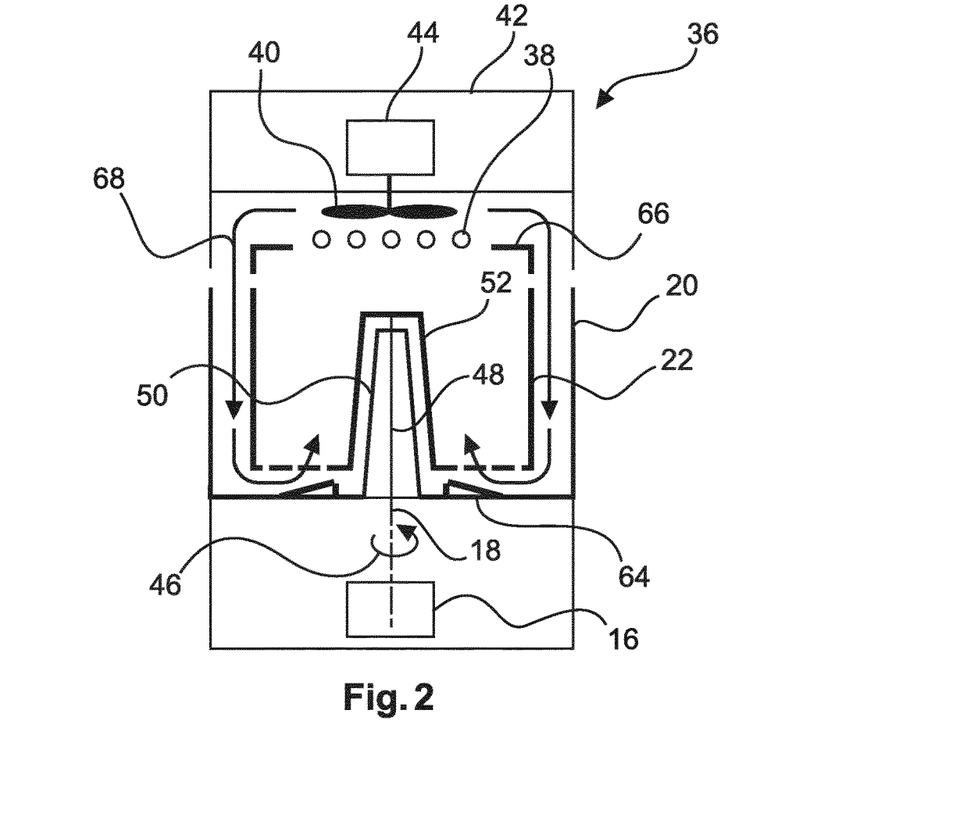
FIG. 2 shows a further example of an apparatus according to the invention, in which a food basket is rotated.

In a further example, as indicated in FIG. 2 following, the system 36 is provided with an upper enclosure portion 42 having a drive 44 for the ventilation means 40, which drive 44 is arranged inside the enclosure 42, wherein the ventilation means 40 are exposed on a side oriented towards the container 20. Similar, also the heating means 38 are arranged in an exposed manner towards the container 20.

The rotational movement around the vertical axis 18 provided by the gearing system 16, is indicated with a rotational arrow 46.

In an example, for a relative rotational movement, the food basket 22 is driven in rotation by the gearing system 16 around the vertical rotation axis 18.

FIG. 2 shows an example, where the food basket 22 is directly coupled with the gearing system with a rotating rod 48. For example, shown as an option in FIG. 2 et seq., the container 20 is provided with a central protrusion portion 50 arranged as a steep conical member in the centre portion. The vertically extending rod 48 is reaching through this protrusion 50 and the food basket 22 is provided with a matching corresponding cone-like protrusion 52 to vertically enclose the protrusion 50 of the container 20.

Figure 3:
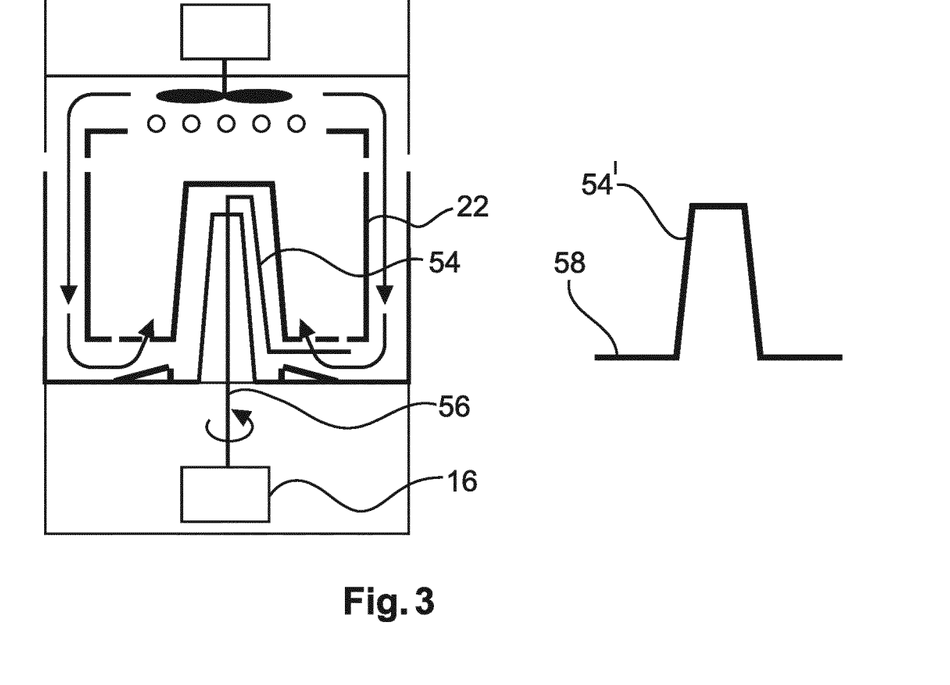
FIG. 3 shows a further example of an apparatus according to the invention, in which a food basket is rotated by being supported by a rotating stirrer.

FIG. 3 shows a further example, where the food basket 22 is supported by a food stirrer 54 that is driven by the gearing system 16. For example, a coupling rod 56 couples the food stirrer 54 to the gearing system 16. In the example shown in FIG. 3, the food stirrer 54 is provided as a cantilevering arm portion. In a further option, shown beside the apparatus in FIG. 3, food stirrer 54' is having opposing horizontal portions 58 for supporting the food basket 22.

Figure 4:
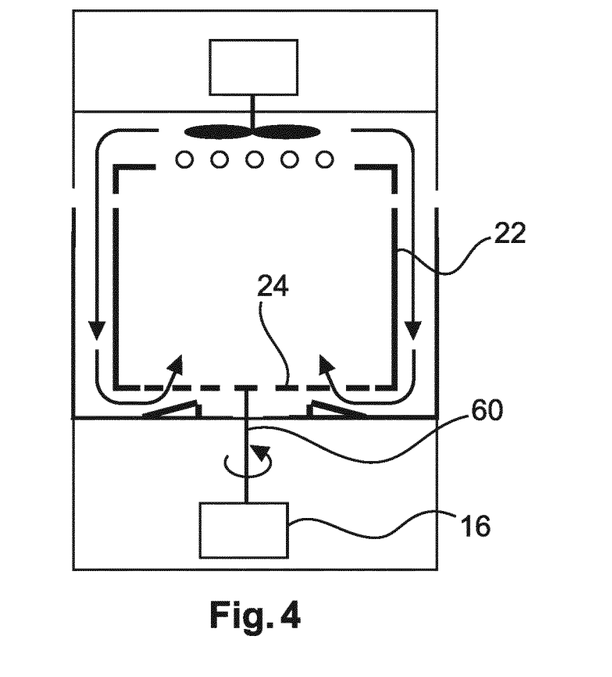
FIG. 4 shows a further example of an apparatus according to the invention, where the food basket is directly rotated by a gearing system.

FIG. 4 shows a further example, where the food basket 22 is having a flat bottom part 24, and where a coupling element 60 provides a direct coupling between the food basket 22 and the gearing system 16.

Figure 5:
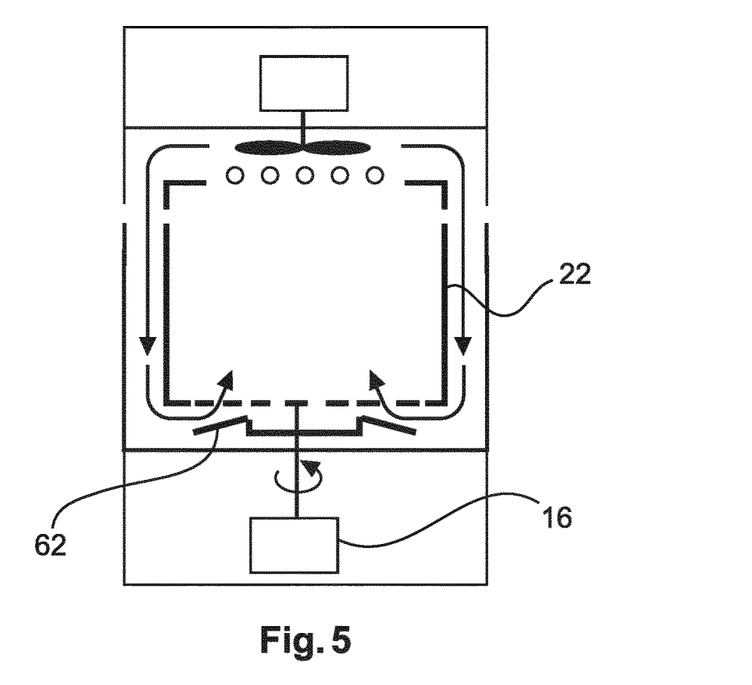
FIG. 5 shows a further example of an apparatus according to the invention with a rotating air guide member.

In FIG. 5, a rotating air guide member 62 is provided that is directly coupled to the gearing system 16. The food basket 22 is supported by the rotating air guide member 62.

In case of the air guide member 62 rotating together with the food basket 22, the air guide member 62 does not affect the flow of hot air in the rotational direction, but only in the way of directing the airflow in an upwards direction.

As a further option, air guide members 64 are also provided in relation with the example of FIGS. 2, 3 and 4. However, it must be noted that the air guide members 64 are shown as an option only.

As a further option, a reflector 66 may be provided in the region of the upper lid device 34 for further enclosing the volume enclosed by the food basket 22. However, as indicated, this is shown as an option only in FIGS. 2, 3, 4 and 5.

The above-mentioned flow of hot air provided as an airstream in a circulating manner is indicated in the figures with airflow arrows 68.

As a still further example, which is also indicated in relation with FIG. 5, it is provided that the food basket 22 is arranged in a fixed manner, i.e. being still, whereas the air guide member 62 is rotating.

Figure 6:
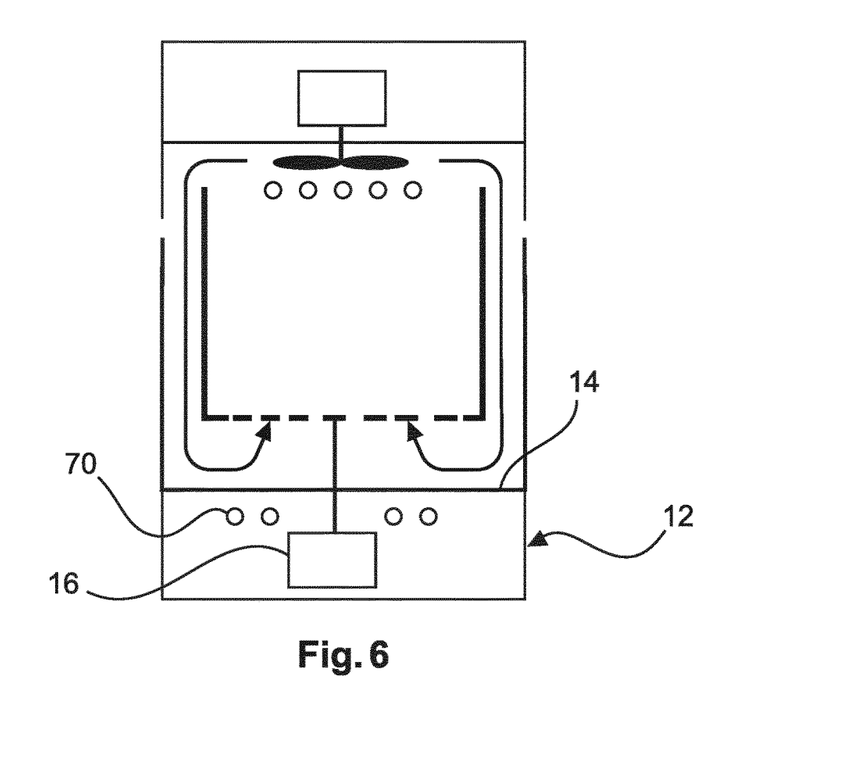
FIG. 6 shows a further example of an apparatus according to the invention comprising secondary heating elements in the base part.

FIG. 6 shows a further example, in which the base part 12 comprises a secondary heating element 70 to heat the upper support 14. For example, the secondary heating element is referred to as second heating means.

Figure 7:
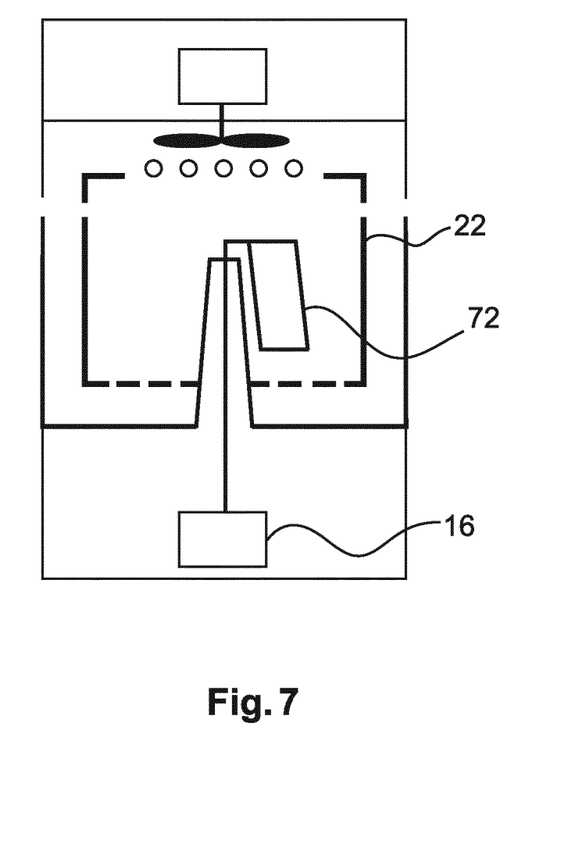
FIG. 7 shows an example of an apparatus according to the invention comprising a food stirring element in the food basket.

FIG. 7 shows an example, where a food stirring element 72 is provided in the food basket 22. The food stirring element, or food stirring member, is driven in rotation by the gearing system 16.

As indicated above, in relation with FIG. 6, it is provided as an option that the apparatus comprises primary and secondary heating means.

In an example, the primary and secondary heating means are provided as dual-heat supply means. In a primary heating mode, convection heat is supplied from the primary heating elements to the flow of air provided by the ventilation means. In a secondary heating mode, the secondary heating elements supply heat to the food in the food basket. In the secondary heating mode, food may also be provided in the container.

For example, the secondary heating elements supply radiation heat. Alternatively, or in addition, the secondary heating elements supply convection heat or heat by water steam (as a so-called steaming function) heating.

In an example, where secondary heating elements are provided in the base part 12, it is possible to prepare food not only in the food basket, but also in the container, for example when the food basket 22 is temporarily removed. In such a case, for example the food stirring element 72 of FIG. 7 can be used for further food preparation concepts.

In an example, the stirring means are provided inside the food basket for providing a relative movement of the food to be prepared in relation to the food basket.

In an example, the gearing system and/or the rotating means are provided with translation means for translating a rotational movement into vibrations, which are provided for shaking the food in the food basket.

According to an example, the air ventilation means comprise a primary (or first) motor, and the gearing system comprises a secondary (or second) motor.

In an example, the apparatus is provided as a dual-function rotation arrangement comprising rotation for the generation of the ventilation for generating the flow of air and rotation of the food in relation with the flow of hot air.

In an example, not further shown in detail, a dual-function rotation arrangement is provided comprising first rotation means and second rotation means. The first rotation means are provided for stirring food inside the food basket in relation to the food basket, and the second rotation means are arranged for providing a relative movement between the food basket and the flow of hot air.

For example, a common spindle is provided inside the food basket driven by the gearing system, wherein the spindle is configured to receive the first rotation means and the second rotation means.

In a further example, also not further shown in detail, the apparatus is a multi-mode food preparation apparatus comprising at least a first and a second mode of operation.

The first mode is a hot air mode, in which food is arranged inside the food basket, and in which heat is provided mainly by the primary heating means. The second mode is a cooking mode, in which food is arranged inside the food basket, and in which heat is provided mainly by the secondary heating means from below. In the second mode, the food can also be arranged in the food container, for example when the food basket is temporarily removed.

The term "mainly" refers to, for example, a range of approximately more than 50%, e.g. at least 75% of the amount.

In an example, the heat is provided exclusively, i.e. only, by the respective primary and secondary heating means.

In an example, in the first mode, the food is stirred by the rotating means.

In another example, in the second mode, the food is rotated by the rotating means.

In a further example, also not shown in more detail, a third mode is a dual heat mode, in which food is arranged inside the food basket, and in which heat is provided from the primary heating means and the secondary heating means.

In an example, in the third mode, the food to be prepared is supplied with top heat from the upper heating means, and with bottom heat from the lower heating means.

In an example, the secondary heating means are configured to provide heat towards the food in the food preparation basket and/or container.

In a further example, an adapter arrangement is provided for temporarily connecting the upper lid device 34 to the container 20.

In an example, the base part comprises a user control interface (not further shown) for controlling the first heating means.

In an option, the base part also comprises a first user control interface for controlling the upper lid device.

In another option, the upper lid device comprises a second user control interface for controlling the upper lid device.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An air-based fryer apparatus for preparing food, the air-based fryer apparatus comprising:
    a base part including an upper support and a gearing system to generate a rotation force around a vertical rotation axis;
    a container arranged on the upper support, the container having walls and a bottom part;
    a food basket with walls and an air-permeable bottom part, the food basket placed inside the container such that a lateral gap is arranged between the walls of the container and the walls of the food basket, and such that a bottom gap is arranged between the bottom part of the container and said air-permeable bottom part of the food basket; and
    an upper lid device arranged on top of the container, the upper lid device including a system with primary heating means and an air ventilator that generates a flow of hot air, provided as an airstream in a circulating manner through the lateral gap, the bottom gap and the air-permeable bottom part of the food basket, such that food in the food basket is prepared by a through-streaming of the hot air in the food basket; and
    wherein the gearing system is adapted to provide a relative rotational movement at least between food arranged in the food basket and the through-streaming of hot air in the food basket.

2. The air-based fryer apparatus according to claim 1, wherein the gearing system is adapted to drive the food basket in rotation around the vertical rotation axis to create said relative rotational movement.

3. The air-based fryer apparatus according to claim 2, wherein the gearing system is adapted to drive the food basket in rotation by direct coupling.

4. The air-based fryer apparatus according to claim 1,
    wherein the food basket is fixed relative to the container, and
    wherein the gearing system is adapted to stir-drive in rotation around the vertical rotation axis the food in the basket.

5. The air-based fryer apparatus according to claim 1, wherein the base part includes a food stirrer for supporting the food basket.

6. The air-based fryer apparatus according to claim 1, wherein the base part includes a secondary heating element to heat the upper support.

7. The air-based fryer apparatus according to claim 1, further comprising:
    an air guide member provided in the container below the food basket to guide air upwards into the food basket.

8. The air-based fryer apparatus according to claim 7, wherein the gearing system is adapted to drive in rotation the air guide member.

9. The air-based fryer apparatus according to claim 1, further comprising:
    a food stirring element in the food basket, wherein the gearing system is adapted to drive the food stirring element in rotation.

10. The air-based fryer apparatus according to claim 1, wherein:
    the base part includes a secondary heating means;
    the primary heating means and the secondary heating means are provided as dual-heat supply means;
    in a primary heating mode, convection heat from the primary heating means is supplied to the flow of hot air provided by the air ventilator; and
    in a secondary heating mode, heat from the secondary heating means is supplied to the food in the food basket and/or to the container.

11. The air-based fryer apparatus according to claim 9, further comprising:
    an air guide member provided in the container below the food basket to guide air upwards into the food basket, wherein the gearing system is adapted to drive the air guide member in rotation.

12. The air-based fryer apparatus according to claim 1, wherein:
    the base part includes a secondary heating means;
    the air-based fryer apparatus is a multi-mode food preparation apparatus including at least a first mode of operation and a second mode of operation;

the first mode of operation is a hot air mode in which food is arranged inside the food basket, and in which heat is provided mainly by the primary heating means; and the second mode of operation is a cooking mode, in which food is arranged inside the food basket and/or in the container, and in which heat is provided mainly by the secondary heating means.

13. The air-based fryer apparatus according to claim 12, wherein the air-based fryer apparatus is a multi-mode food preparation apparatus that further includes a third mode of operation; and wherein the third mode of operation is a dual-heat mode in which food is arranged inside the food basket and in which heat is provided from the primary heating means and the secondary heating means.

14. The air-based fryer apparatus according to claim 1, wherein the upper lid device is connectable to the container.

15. The air-based fryer apparatus according to claim 1, wherein the container includes a protrusion; and wherein the food basket includes a protrusion vertically enclosing the protrusion of the container.

16. The air-based fryer apparatus according to claim 15, wherein the gearing system includes a gear rod extending through the protrusion of the container.

17. The air-based fryer apparatus according to claim 16, wherein the food basket is coupled to the gear rod.

18. The air-based fryer apparatus according to claim 1, wherein the system of the upper lid device further includes a drive connected to the ventilator;

wherein the drive is enclosed within the upper lid device; and wherein the air ventilator is exposed relative to the upper lid device towards the container.

19. The air-based fryer apparatus according to claim 18, wherein the primary heating means is exposed relative to the upper lid device towards the container.

20. The air-based fryer apparatus according to claim 5, wherein the food stirrer is a cantilevering arm having an least one horizontal portion.

* * * * *